(12) United States Patent
Shan et al.

(10) Patent No.: US 8,569,422 B2
(45) Date of Patent: *Oct. 29, 2013

(54) CATALYTIC OLEFIN BLOCK COPOLYMERS WITH CONTROLLED BLOCK SEQUENCE DISTRIBUTION AND AT LEAST ONE LOW CRYSTALLINITY HARD BLOCK

(75) Inventors: Colin Li Pi Shan, Pearland, TX (US); Roger L. Kuhlman, Lake Jackson, TX (US); Gary L. Rath, Pearland, TX (US); Pamela J. Kenny, Lake Jackson, TX (US); Morgan M. Hughes, Angleton, TX (US); Rongjuan Cong, Lake Jackson, TX (US)

(73) Assignee: Dow Global Technologies, LLC, Midland, MI (US)

( * ) Notice: Subject to any disclaimer, the term of this patent is extended or adjusted under 35 U.S.C. 154(b) by 36 days.

This patent is subject to a terminal disclaimer.

(21) Appl. No.: 12/668,800

(22) PCT Filed: Jul. 11, 2008

(86) PCT No.: PCT/US2008/069801
§ 371 (c)(1),
(2), (4) Date: Jan. 12, 2010

(87) PCT Pub. No.: WO2009/012152
PCT Pub. Date: Jan. 22, 2009

(65) Prior Publication Data
US 2010/0197864 A1    Aug. 5, 2010

Related U.S. Application Data

(60) Provisional application No. 60/949,690, filed on Jul. 13, 2007.

(51) Int. Cl.
*C08F 255/00* (2006.01)
*C08F 255/02* (2006.01)
*C08F 255/04* (2006.01)

(52) U.S. Cl.
USPC ............ 525/324; 525/242; 525/322; 525/323

(58) Field of Classification Search
USPC ......... 525/242, 244, 245, 248, 249, 267, 319, 525/320, 322, 323, 324
See application file for complete search history.

(56) References Cited

U.S. PATENT DOCUMENTS

| | | | |
|---|---|---|---|
| 4,507,515 A | 3/1985 | Johnston et al. | |
| 4,762,890 A | 8/1988 | Strait et al. | |
| 4,792,595 A | 12/1988 | Cozewith et al. | |
| 4,900,461 A | 2/1990 | Ver Strate et al. | |
| 4,927,888 A | 5/1990 | Strait et al. | |
| 4,950,541 A | 8/1990 | Tabor et al. | |
| 5,391,629 A * | 2/1995 | Turner et al. | 525/268 |
| 5,401,427 A | 3/1995 | Chung et al. | |
| 5,733,980 A * | 3/1998 | Cozewith et al. | 525/314 |
| 5,798,420 A * | 8/1998 | Cozewith et al. | 525/323 |
| 6,268,444 B1 | 7/2001 | Klosin et al. | |
| 6,953,764 B2 | 10/2005 | Frazier et al. | |
| 7,053,153 B2 | 5/2006 | Schauder | |
| 7,608,668 B2 | 10/2009 | Li Pi Shan et al. | |
| 7,714,071 B2 | 5/2010 | Hoenig et al. | |
| 2003/0004268 A1 | 1/2003 | Sundararaj et al. | |
| 2003/0204017 A1 | 10/2003 | Stevens et al. | |
| 2004/0010103 A1 | 1/2004 | Boussie et al. | |
| 2006/0199030 A1* | 9/2006 | Liang et al. | 428/515 |
| 2006/0199744 A1* | 9/2006 | Walton et al. | 508/110 |
| 2006/0199897 A1* | 9/2006 | Karjala et al. | 524/543 |
| 2006/0199906 A1* | 9/2006 | Walton et al. | 525/191 |
| 2006/0199908 A1* | 9/2006 | Cheung et al. | 525/191 |
| 2006/0199910 A1* | 9/2006 | Walton et al. | 525/192 |
| 2006/0199911 A1* | 9/2006 | Markovich et al. | 525/192 |
| 2006/0199912 A1* | 9/2006 | Fuchs et al. | 525/240 |
| 2006/0199914 A1* | 9/2006 | Harris et al. | 525/242 |
| 2006/0199930 A1 | 9/2006 | Li Pi Shan et al. | |
| 2006/0211819 A1* | 9/2006 | Hoenig et al. | 525/88 |
| 2007/0010616 A1* | 1/2007 | Kapur et al. | 524/525 |
| 2007/0066756 A1* | 3/2007 | Poon et al. | 525/191 |
| 2007/0078222 A1* | 4/2007 | Chang et al. | 525/88 |
| 2007/0112127 A1* | 5/2007 | Soediono et al. | 524/543 |
| 2007/0155900 A1* | 7/2007 | Chang et al. | 525/88 |
| 2007/0202330 A1* | 8/2007 | Peng et al. | 428/375 |
| 2008/0269366 A1* | 10/2008 | Shaffer et al. | 521/134 |
| 2008/0281037 A1* | 11/2008 | Karjala et al. | 524/571 |
| 2008/0299857 A1* | 12/2008 | Harding et al. | 442/329 |
| 2009/0105417 A1* | 4/2009 | Walton et al. | 525/88 |

(Continued)

FOREIGN PATENT DOCUMENTS

| | | |
|---|---|---|
| EP | 1178102 A1 | 2/2002 |
| WO | 9216567 A1 | 10/1992 |

(Continued)

OTHER PUBLICATIONS

US file history for US Patent Application Publication No. 2010-0197540.
US file history for US Patent Application Publication No. 2010-0197541.
US file history for US Patent Application Publication No. 2010-0197880.
Arriola et al., "Catalytic Production of Olefin Block Coplymers via Chain Shuttling Polymerization", Science, 312 (2006).
International Search Report and Written Opinion issued in PCT/US08/69801, dated Sep. 30, 2008.

*Primary Examiner* — Irina S Zemel
*Assistant Examiner* — Jeffrey Lenihan

(57) ABSTRACT

The invention is related to catalytic olefin block copolymers with a controlled block sequence distribution and at least one low crystallinity hard block. The block copolymer has a number of unique characteristics disclosed here.

8 Claims, 1 Drawing Sheet

(56) References Cited

U.S. PATENT DOCUMENTS

| | | | |
|---|---|---|---|
| 2009/0324914 A1* | 12/2009 | Liang et al. .................... | 428/219 |
| 2010/0197540 A1* | 8/2010 | Shan et al. .................... | 508/591 |
| 2010/0197541 A1* | 8/2010 | Li Pi Shan et al. ........... | 508/591 |
| 2010/0197880 A1 | 8/2010 | Shan et al. | |

FOREIGN PATENT DOCUMENTS

| | | | | |
|---|---|---|---|---|
| WO | 9216568 A1 | 10/1992 | | |
| WO | 03040195 | 5/2003 | | |
| WO | 03/051935 A1 | 6/2003 | | |
| WO | 2004024740 | 3/2004 | | |
| WO | 2005/090425 A1 | 9/2005 | | |
| WO | 2005/090426 A1 | 9/2005 | | |
| WO | 2005/090427 A1 | 9/2005 | | |
| WO | 2006/102146 A2 | 9/2006 | | |
| WO | 2006/102153 A1 | 9/2006 | | |
| WO | WO 2006101924 A2 * | 9/2006 | .............. | C08F 10/00 |
| WO | WO 2006102150 A2 * | 9/2006 | .............. | C08F 10/16 |

\* cited by examiner

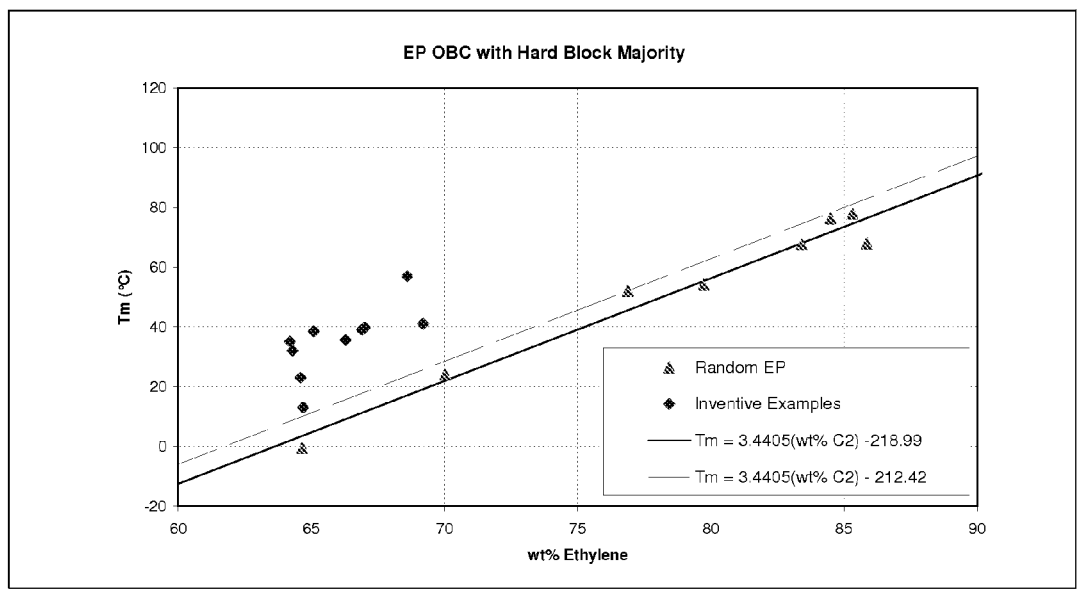

CATALYTIC OLEFIN BLOCK COPOLYMERS WITH CONTROLLED BLOCK SEQUENCE DISTRIBUTION AND AT LEAST ONE LOW CRYSTALLINITY HARD BLOCK

CROSS REFERENCE TO RELATED APPLICATIONS

This application claims priority to U.S. Provisional Application No. 60/949,690, filed on Jul. 13, 2007, which is herein incorporated by reference in its entirety. This application is related to the following US applications, all filed provisionally and concurrently with this application Ser. No. 60/949,698; Ser. No. 60/949,702 and Ser. No. 60/949,670 all of which are herein incorporated by reference.

FIELD OF THE INVENTION

This invention relates to catalytic olefin block copolymers with a controlled block sequence distribution and at least one low crystallinity hard block.

BACKGROUND OF THE INVENTION

Block copolymers comprise sequences ("blocks") of monomer units, covalently bound to sequences of unlike type. The blocks can be connected in a variety of ways, such as A-B in diblock and A-B-A triblock structures, where A represents one block and B represents a different block. In a multi-block copolymer, A and B can be connected in a number of different ways and be repeated multiply. It may further comprise additional blocks of different type. Multi-block copolymers can be either linear multi-block or multi-block star polymers (in which all blocks bond to the same atom or chemical moiety).

A linear block copolymer is created when two or more polymer molecules of different chemical composition are covalently bonded in an end-to-end fashion. While a wide variety of block copolymer architectures are possible, most block copolymers involve the covalent bonding of hard plastic blocks, which are substantially crystalline or glassy, to elastomeric blocks forming thermoplastic elastomers. Other block copolymers, such as rubber-rubber (elastomer-elastomer), glass-glass, and glass-crystalline block copolymers, are also possible and may have commercial importance.

One method to make block copolymers is to produce a "living polymer." Unlike typical Ziegler-Natta polymerization processes, living polymerization processes involve only initiation and propagation steps and essentially lack chain terminating side reactions. This permits the synthesis of predetermined and well-controlled structures desired in a block copolymer. A polymer created in a "living" system can have a narrow or extremely narrow distribution of molecular weight and be essentially monodisperse (i.e., the molecular weight distribution is essentially one). Living catalyst systems are characterized by an initiation rate which is on the order of or exceeds the propagation rate, and the absence of termination or transfer reactions. In addition, these catalyst systems are characterized by the presence of a single type of active site. To produce a high yield of block copolymer in a polymerization process, the catalyst must exhibit living characteristics to a substantial extent.

Butadiene-isoprene block copolymers have been synthesized via anionic polymerization using the sequential monomer addition technique. In sequential addition, a certain amount of one of the monomers is contacted with the catalyst. Once a first such monomer has reacted to substantial extinction forming the first block, a certain amount of the second monomer or monomer species is introduced and allowed to react to form the second block. The process may be repeated using the same or other anionically polymerizable monomers. However, ethylene and other $\alpha$-olefins, such as propylene, butene, 1-octene, etc., are not directly block polymerizable by anionic techniques.

Recently, a method has been described for a process of catalytically making block copolymers with a controlled sequence distribution in publication WO2007/035485. As discussed in this publication, it has long been known that polymers containing a block-type structure often have superior properties compared to random copolymers and blends. For example, triblock copolymers of styrene and butadiene (SBS) and hydrogenated versions of the same (SEBS) have an excellent combination of heat resistance and elasticity. Other block copolymers are also known in the art. Generally, block copolymers known as thermoplastic elastomers (TPE) have desirable properties due to the presence of "soft" or elastomeric block segments connecting "hard" either crystallizable or glassy blocks in the same polymer. At temperatures up to the melt temperature or glass transition temperature of the hard segments, the polymers demonstrate elastomeric character. At higher temperatures, the polymers become flowable, exhibiting thermoplastic behavior. Known methods of preparing block copolymers include anionic polymerization and controlled free radical polymerization. Unfortunately, these methods of preparing block copolymers require sequential monomer addition with polymerization to relative completeness and the types of monomers that can be usefully employed in such methods are limited. For example, in the anionic polymerization of styrene and butadiene to form a SBS type block copolymer, each polymer chain requires a stoichiometric amount of initiator and the resulting polymers have extremely narrow molecular weight distribution, Mw/Mn, preferably from 1.0 to 1.3. That is, the polymer block lengths are substantially identical. Additionally, anionic and free-radical processes are relatively slow, resulting in poor process economics, and not readily adapted to polymerization of $\alpha$-olefins.

It would be desirable to produce block copolymers catalytically, that is, in a process wherein more than one polymer molecule is produced for each catalyst or initiator molecule. In addition, it would be highly desirable to produce copolymers having properties resembling block copolymers from olefin monomers such as ethylene, propylene, and higher alpha-olefins that are generally unsuited for use in anionic or free-radical polymerizations. In certain of these polymers, it is highly desirable that some or all of the polymer blocks comprise amorphous polymers such as a copolymer of ethylene and a comonomer, especially amorphous random copolymers comprising ethylene and an $\alpha$-olefin having 3 or more carbon atoms. Finally, it would be desirable to prepare pseudo-block or block copolymers wherein a substantial fraction of the polymer molecules are of a controlled block number, especially diblocks or triblocks, but wherein the block lengths are a most probable distribution, rather than identical or nearly identical block lengths.

It would be useful to produce additional such block copolymers which are based on ethylene and $\alpha$-olefins and have at least one low crystallinity hard block.

SUMMARY OF INVENTION

The invention provides an ethylene/$\alpha$-olefin interpolymer comprising two or more substantially homogeneous intramolecular segments or blocks comprising differing chemical or physical properties, said intramolecular segments characterized by possessing a most probable molecular weight distribution, wherein the ethylene/α-olefin interpolymer comprises a hard segment and a soft segment, and:
  (a) has a Mw/Mn from about 1.7 to about 3.5;
  (b) has an ethylene content in the hard segment in the range of from 60 wt % to 95 wt % based on based on total monomer content in hard segment;
  (c) (i) has a hard segment composition of at least 40%, at least one melting point, Tm, in degrees Celsius and an amount of ethylene in weight percent, wt % $C_2$, wherein the numerical values of Tm and wt % $C_2$ correspond to the relationship:

$90°\,C. \geq Tm \geq 4.1276(wt\,\%\,C_2) - 244.76$; or (ii) has a hard segment composition of less than 40%, at least one melting point, Tm, in degrees Celsius and an amount of ethylene in weight percent, wt % $C_2$, wherein the numerical values of Tm and wt % $C_2$ correspond to the relationship:

$80°\,C. \geq Tm \leq 4.1276(wt\,\%\,C_2) - 264.95$; or (iii) is characterized by an average block index greater than zero and up to about 1.0 and a molecular weight distribution, $M_w/M_n$, greater than about 1.3; or
  (iv) has a molecular fraction which elutes between 0° C. and 130° C. when fractionated using low temperature TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or
  (v) has a relationship between ethylene content in wt % and log molecular weight such that a line plotted of ethylene content vs log molecular weight as measured by GPC-IR has an absolute slope, m, of equal to or less than 4; and,
  (d) has a turbidity measurement of a 1.0 wt % solution of the ethylene/α-olefin interpolymer in oil or a 1.5 wt % solution in dodecane of less than or equal to that of a comparable copolymer wherein the comparable copolymer has the same DSC enthalpy (J/g) at greater than 55° C. within ±5 J/g and the same overall ethylene content within 10%.

The invention also provides an ethylene/α-olefin interpolymer comprising two or more substantially homogeneous intramolecular segments or blocks comprising differing chemical or physical properties, said intramolecular segments characterized by possessing a most probable molecular weight distribution, wherein the ethylene/α-olefin interpolymer comprises a hard segment and a soft segment, and wherein:
  (a) has a Mw/Mn from about 1.7 to about 3.5;
  (b) has an ethylene content in the hard segment in the range of from 60 wt % to 95 wt % based on based on total monomer content in hard segment;
  (c) (i) has a hard segment in an amount of at least 40%, at least one melting point, Tm, in degrees Celsius and an amount of ethylene in weight percent, wt % $C_2$, wherein the numerical values of Tm and wt % $C_2$ correspond to the relationship:

$0°\,C. \geq Tm \geq 3.4405(wt\,\%\,C_2) - 218.99$; or (ii) has a hard segment composition of less than 40%, at least one melting point, Tm, in degrees Celsius and an amount of ethylene in weight percent, wt % $C_2$, wherein the numerical values of Tm and wt % $C_2$ correspond to the relationship:

$80°\,C. \geq Tm \leq 4.1276(wt\,\%\,C_2) - 264.95$; or (iii) is characterized by an average block index greater than zero and up to about 1.0 and a molecular weight distribution, $M_w/M_n$, greater than about 1.3; or
  (iv) has a molecular fraction which elutes between 0° C. and 130° C. when fractionated using low temperature TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or
  (v) has a relationship between ethylene content in wt % and log molecular weight such that a line plotted of ethylene content vs log molecular weight as measured by GPC-IR has an absolute slope, m, of equal to or less than 4; and,
  (d) has a turbidity measurement of a 1.0 wt % solution of the ethylene/α-olefin interpolymer in oil or a 1.5 wt % solution in dodecane of less than or equal to that of a comparable copolymer wherein the comparable copolymer has the same DSC enthalpy (J/g) at greater than 55° C. within ±5 J/g and the same overall ethylene content within 10%.

The ethylene/α-olefin interpolymer can have one or any combination of the above characteristics.

In one embodiment, the ethylene/α-olefin interpolymer has (a) at least one molecular fraction which elutes between 0° C. and 130° C. when fractionated using TREF, characterized in that the fraction has a block index of at least 0.5 and up to about 1 and a molecular weight distribution, Mw/Mn, greater than about 1.3 or (b) an average block index greater than zero and up to about 1.0 and a molecular weight distribution, Mw/Mn, greater than about 1.3.

In one embodiment, the α-olefin used in the ethylene/α-olefin interpolymer is styrene, propylene, 1-butene, 1-hexene, 1-octene, 4-methyl-1-pentene, norbornene, 1-decene, 1,5-hexadiene, or a combination thereof.

In another embodiment, the ethylene/α-olefin interpolymer has a melt index in the range of about 0.1 to about 2000 g/10 minutes, about 2 to about 1500 g/10 minutes, about 2 to about 1000 g/10 minutes or about 2 to about 500 g/10 minutes measured according to ASTM D-1238, Condition 190° C./2.16 kg.

Additional aspects of the invention and characteristics and properties of various embodiments of the invention will become apparent with the following description.

BRIEF DESCRIPTION OF THE DRAWING

The FIGURE shows a plot of $T_m$ vs wt % $C_2$ for hard segment majority copolymers of the invention and for Comparative Examples.

DETAILED DESCRIPTION OF THE INVENTION

General Definitions

"Polymer" means a polymeric compound prepared by polymerizing monomers, whether of the same or a different type. The generic term "polymer" embraces the terms "homopolymer," "copolymer," "terpolymer" as well as "interpolymer."

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/propylene copolymers, the preferred composition comprises an ethylene content in the range of from about 55 wt % to about 75 wt %, preferably in the range of from about 60 wt % to about 73 wt %, based on the weight of the polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The terms "pseudo-block copolymer" or "block copolymer" refer to a copolymer comprising two or more blocks or segments of differing chemical or physical property, such as variable comonomer content, crystallinity, density, tacticity, regio-error, or other property. Non-adjacent blocks are not necessarily of identical chemical composition, but may vary in one or more of the foregoing respects, from the composition of all other blocks or regions.

The pseudo-block copolymers typically comprise various amounts of "hard" and "soft" segments. "Hard" segments refer to blocks of polymerized units in which ethylene is present in an amount in the range of from about 60 wt % to about 95 wt %, and preferably in the range of from about 70 wt % to about 85 wt %, based on the weight of the polymer. "Soft" segments, on the other hand, refer to blocks of polymerized units in which the comonomer content (content of monomers other than ethylene) is in the range of from about 30 wt % to about 80 wt %, preferably in the range of from about 35 wt % to about 80 wt %, based on the weight of the polymer.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The polymer is said to have a hard segment majority when the amount of hard segment present is greater than 40% and a soft segment majority when the amount of hard segment is less than 60%. The soft segment weight percentage and the hard segment weight percentage can be calculated based on data obtained from DSC or NMR. Such methods and calculations are disclosed in U.S. patent application Ser. No. 11/376,835, US Patent Application Publication Number 2006-0199930, entitled "Ethylene/α-Olefin Block Interpolymers", filed on Mar. 15, 2006, in the name of Cohn L. P. Shan, Lonnie Hazlitt, et. al. and assigned to Dow Global Technologies Inc., the disclosure of which is incorporated by reference herein in its entirety.

The term "crystalline" if employed, refers to a polymer that possesses a first order transition or crystalline melting point (Tm) as determined by differential scanning calorimetry (DSC) or equivalent technique. The term may be used interchangeably with the term "semicrystalline". The term "amorphous" refers to a polymer lacking a crystalline melting point as determined by differential scanning calorimetry (DSC) or equivalent technique.

Ethylene/α-olefin interpolymers containing low crystallinity hard blocks are polymers that have hard blocks that have melting points that are less than 100° C. These polymers differ from high melting point block copolymers in that their primary use is for compatibilization of polymer blend components and/or improving the solubility of polymers in solvents and oils. Applications include oil viscosity modifiers, thermoplastic olefin impact modifiers and compatibilizers, elastomer cross-linking and heat sealing polymers. Applications such as these require polymers with a low but broad range of temperatures for thermosetting and heat sealing operations.

Processes useful for making the polymers have been described in WO2007/035485, which is herein incorporated by reference in its entirety. In particular, the polymers may be made by a process comprising contacting an addition polymerizable monomer or mixture of monomers under addition polymerization conditions with a composition comprising at least one addition polymerization catalyst, a cocatalyst and a chain shuttling agent, said process being characterized by formation of at least some of the growing polymer chains under differentiated process conditions in two or more reactors operating under steady state polymerization conditions or in two or more zones of a reactor operating under plug flow polymerization conditions. Chain terminating agents such as hydrogen may be used if desired to control reactor viscosity or polymer molecular weight.

The copolymers of the invention are characterized by unique distributions of polymer polydispersity (PDI or Mw/Mn) and block length distribution, with two or three, preferably two different block compositions. This is due, in a preferred embodiment, to the effect of the use of one or more shuttling agents in combination with a high activity metal complex based polymerization catalyst in two or more polymerization reactors or zones operating under differing polymerization conditions. More specifically, the copolymers of the invention desirably possess PDI from 1.7 to 2.9, preferably from 1.8 to 2.5, more preferably from 1.8 to 2.2, and most preferably from 1.8 to 2.1. The copolymers may also possess PDI of less than 1.8.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

Disclosed herein is an ethylene/α-olefin interpolymer comprising two or more substantially homogeneous intramolecular segments or blocks comprising differing chemical or physical properties, said intramolecular segments characterized by possessing a most probable molecular weight distribution, wherein the ethylene/α-olefin interpolymer comprises a hard segment and a soft segment, and:

(a) has a Mw/Mn from about 1.7 to about 3.5;
(b) has an ethylene content in the hard segment in the range of from 60 wt % to 95 wt % based on based on total monomer content in hard segment;
(c) (i) has a hard segment in an amount of at least 40%, at least one melting point, Tm, in degrees Celsius and an amount of ethylene in weight percent, wt % $C_2$, wherein the numerical values of Tm and wt % $C_2$ correspond to the relationship:

$$90° C. \geq Tm \geq 4.1276(\text{wt \% } C_2)-244.76; \text{ or}$$

(ii) has a hard segment composition of less than 40%, at least one melting point, Tm, in degrees Celsius and an amount of ethylene in weight percent, wt % $C_2$, wherein the numerical values of Tm and wt % $C_2$ correspond to the relationship:

$$80° C. \geq Tm \leq 4.1276(\text{wt \% } C_2)-264.95; \text{ or}$$

(iii) is characterized by an average block index greater than zero and up to about 1.0 and a molecular weight distribution, $M_w/M_n$, greater than about 1.3; or
(iv) has a molecular fraction which elutes between 0° C. and 130° C. when fractionated using low temperature TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or
(v) has a relationship between ethylene content in wt % and log molecular weight such that a line plotted of ethylene content vs log molecular weight as measured by GPC-IR has an absolute slope, m, of equal to or less than 4; and,
(d) has a turbidity measurement of a 1.0 wt % solution of the ethylene/α-olefin interpolymer in oil or a 1.5 wt % solution in dodecane of less than or equal to that of a comparable copolymer wherein the comparable copolymer has the same DSC enthalpy (J/g) at greater than 55° C. within ±5 J/g and the same overall ethylene content within 10%.

In some embodiments, the invention provides an ethylene/α-olefin interpolymer comprising two or more substantially homogeneous intramolecular segments or blocks comprising differing chemical or physical properties, said intramolecular segments characterized by possessing a most probable molecular weight distribution, wherein the ethylene/α-olefin interpolymer comprises a hard segment and a soft segment, and wherein:

(a) has a Mw/Mn from about 1.7 to about 3.5;
(b) has an ethylene content in the hard segment in the range of from 60 wt % to 95 wt % based on based on total monomer content in hard segment;
(c) (i) has a hard segment in an amount of at least 40%, at least one melting point, Tm, in degrees Celsius and an amount of ethylene in weight percent, wt % $C_2$, wherein the numerical values of Tm and wt % $C_2$ correspond to the relationship:

$$0° C. \geq Tm \geq 3.4405(\text{wt \% } C_2)-218.99; \text{ or}$$

(ii) has a hard segment composition of less than 40%, at least one melting point, Tm, in degrees Celsius and an amount of ethylene in weight percent, wt % $C_2$, wherein the numerical values of Tm and wt % $C_2$ correspond to the relationship:

$$80° C. \geq Tm \leq 4.1276(\text{wt \% } C_2)-264.95; \text{ or}$$

(iii) is characterized by an average block index greater than zero and up to about 1.0 and a molecular weight distribution, $M_w/M_n$, greater than about 1.3; or
(iv) has a molecular fraction which elutes between 0° C. and 130° C. when fractionated using low temperature TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or
(v) has a relationship between ethylene content in wt % and log molecular weight such that a line plotted of ethylene content vs log molecular weight as measured by GPC-IR has an absolute slope, m, of equal to or less than 4; and,
(d) has a turbidity measurement of a 1.0 wt % solution of the ethylene/α-olefin interpolymer in oil or a 1.5 wt % solution in dodecane of less than or equal to that of a comparable copolymer wherein the comparable copolymer has the same DSC enthalpy (J/g) at greater than 55° C. within ±5 J/g and the same overall ethylene content within 10%.

In another embodiment, the ethylene/α-olefin interpolymer has a hard segment in an amount of at least 40%, at least one melting point, Tm, in degrees Celsius and an amount of ethylene in weight percent, wt % $C_2$, wherein the numerical values of Tm and wt % $C_2$ correspond to the relationship:

$$0° C. \geq Tm \geq 3.4405(\text{wt \% } C_2)-212.42.$$

The ethylene/α-olefin interpolymer can have one or any combination of the above characteristics.

Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by segments of two or more polymerized monomer units differing in chemical or physical properties (block interpolymer). These pseudo-block copolymers comprise two or more substantially homogeneous intramolecular segments or blocks comprising differing chemical or physical properties, said intramolecular segments characterized by possessing a most probable molecular weight distribution In one aspect, the ethylene/α-olefin interpolymers have a molecular fraction which elutes between 0° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable interpolymer has a total comonomer content within 10 weight percent of that of the block interpolymer.

In some embodiments, the pseudo-block copolymers possess a PDI fitting a Schultz-Flory distribution rather than a Poisson distribution. The copolymers are further characterized as having a polydisperse distribution of block sizes and possessing a most probable distribution of block lengths. Preferred block copolymers are those containing 2 or more blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by a number of blocks (i.e., at least two blocks) or segments of two or more polymerized monomer units differing in chemical or physical properties (blocked interpolymer), said block interpolymer having a peak (but not just a molecular fraction) which elutes between 0° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined for a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl:methylene area ratio [$CH_3/CH_2$] of the TREF peak.

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 $cm^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying the reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170, both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the $i^{th}$ fraction of the inventive ethylene/α-olefin interpolymer obtained in preparative TREF, and $w_i$ is the weight percentage of the $i^{th}$ fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the preparative ATREF elution temperature for the $i^{th}$ fraction (preferably expressed in Kelvin), $P_X$ is the ethylene mole fraction for the $i^{th}$ fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K., $P_A$ is 1.

$T_{AB}$ is the ATREF temperature for a random copolymer of the same composition and having an ethylene mole fraction of $P_{AB}$. $T_{AB}$ can be calculated from the following equation:

$$LnP_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$LnP = -237.83/T_{ATREF} + 0.639$$

$T_{XO}$ is the ATREF temperature for a random copolymer of the same composition and having an ethylene mole fraction of $P_X$. $T_{XO}$ can be calculated from $LnP_X = \alpha/T_{XO} + \beta$. Conversely, $P_{XO}$ is the ethylene mole fraction for a random copolymer of the same composition and having an ATREF temperature of $T_X$, which can be calculated from $Ln P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments, the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000 g/mole, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

In some embodiments, the ethylene/α-olefin interpolymers additionally have a Tm in the range of from −25° C. to 100° C., preferably from 30° C. to 80° C., and more preferably from 35° C. to 75° C. In some embodiments, they may also have a Tm in the range of from 15° C. to 50° C., from 30° C. to 45° C. or from 35° C. to 40° C. In some embodiments, the interpolymers have a Tm that is less than that of a comparable random copolymer with same weight percent comonomer within 10%. In addition, in some embodiments the end of melting occurs at less than 100° C., preferably in the range of from 85° C. to 95° C.

The ethylene/α-olefin interpolymers may also comprise additives and adjuvants. Suitable additives include, but are not limited to, fillers, such as organic or inorganic particles, including clays, talc, titanium dioxide, zeolites, powdered metals, organic or inorganic fibers, nano-sized particles, clays, and so forth; tackifiers, oil extenders, including paraffinic or napthelenic oils; and other natural and synthetic polymers, including other polymers according to embodiments of the invention. Additionally, minor amounts of a different polymer may be used as a carrier for any of the additives. An example of such a polymer would be polyethylene, for example AFFINITY® resins (The Dow Chemical Company) or EXACT® resins (ExxonMobil Chemical Company.

Representative catalysts and chain shuttling agent are as follows. Chemical structures follow each description.

Catalyst (A1) is [N-(2,6-di(1-methylethyl)phenyl)amido) (2-isopropylphenyl)(α-naphthalen-2-diyl(6-pyridin-2-diyl) methane)]hafnium dimethyl, prepared according to the teachings of WO 03/40195, 2003US0204017, U.S. Ser. No. 10/429,024, filed May 2, 2003, and WO 04/24740.

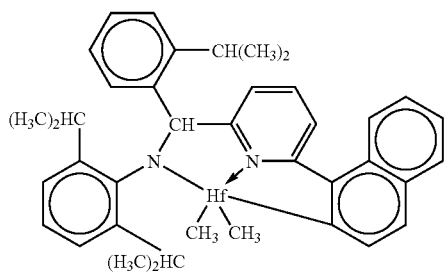

Catalyst (A2) is [N-(2,6-di(1-methylethyl)phenyl)amido) (2-methylphenyl)(1,2-phenylene-(6-pyridin-2-diyl)methane)]hafnium dimethyl, prepared according to the teachings of WO 03/40195, 2003US0204017, U.S. Ser. No. 10/429, 024, filed May 2, 2003, and WO 04/24740.

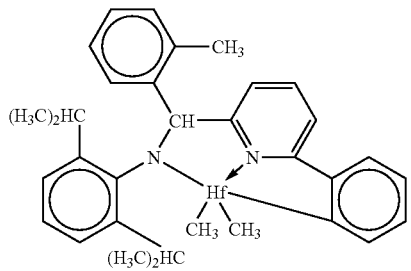

Catalyst (A3) is bis[N,N'''-(2,4,6-tri(methylphenyl)amido) ethylenediamine]hafnium dibenzyl.

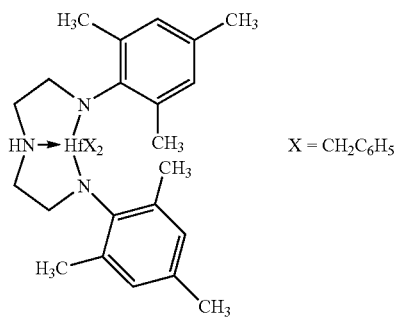

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

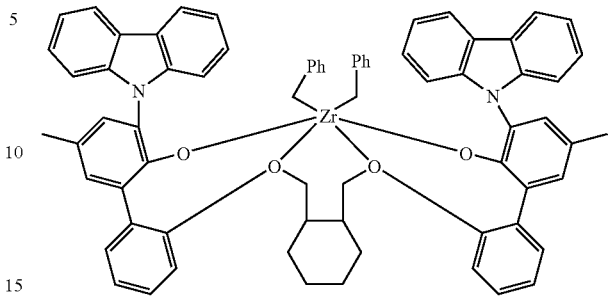

Catalyst (A5) is (bis-(1-methylethyl)(2-oxoyl-3,5-di(t-butyl)phenyl)immino)zirconium dibenzyl.

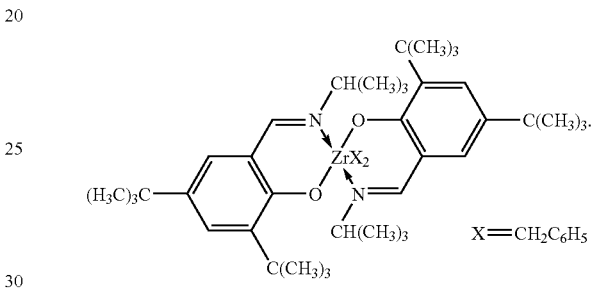

The preparation of catalyst (A5) is conducted as follows.

a) Preparation of (1-methylethyl)(2-hydroxy-3,5-di(t-butyl)phenyl)imine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of (bis-(1-methylethyl)(2-oxoyl-3,5-di(t-butyl)phenyl)immino) zirconium dibenzyl A solution of (1-methylethyl)(2-hydroxy-3,5-di(t-butyl) phenyl)imine (605 mg, 2.2 mmol) in 5 mL toluene is slowly added to a solution of Zr(CH$_2$Ph)$_4$ (500 mg, 1.1 mmol) in 50 mL toluene. The resulting dark yellow solution is stirred for 30 min Solvent is removed under reduced pressure to yield the desired product as a reddish-brown solid.

Catalyst (A6) is bis-(1-(2-methylcyclohexyl)ethyl)(2-oxoyl-3,5-di(t-butyl)phenyl)immino) zirconium dibenzyl

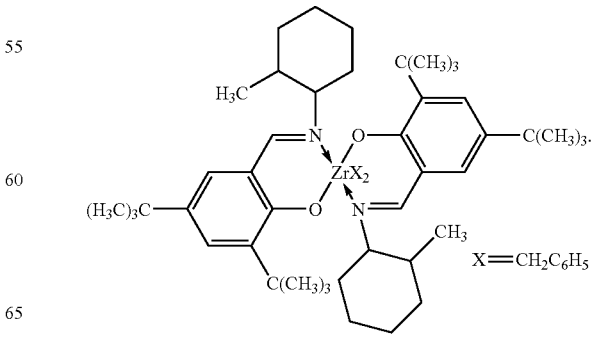

The preparation of catalyst (A6) is conducted as follows.

a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl) (2-oxoyl-3,5-di(t-butyl)phenyl) immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of Zr(CH$_2$Ph)$_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Catalyst (A7) is (t-butylamido)dimethyl(3-N-pyrrolyl-1,2,3,3a,7a-η-inden-1-yl)silanetitanium dimethyl prepared substantially according to the techniques of U.S. Pat. No. 6,268,444:

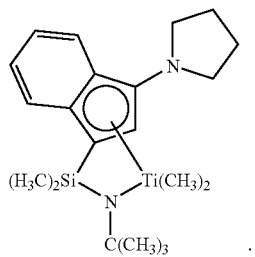

Catalyst (A8) is (t-butylamido)di(4-methylphenyl)(2-methyl-1,2,3,3a,7a-η-inden-1-yl)silanetitanium dimethyl prepared substantially according to the teachings of US-A-2003/004286:

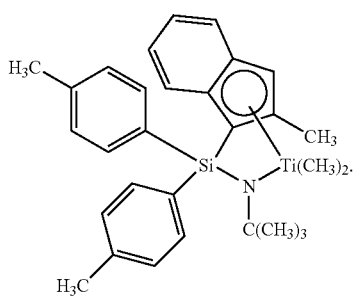

Catalyst (A9) is (t-butylamido)di(4-methylphenyl)(2-methyl-1,2,3,3a,8a-η-s-indacen-1-yl)silanetitanium dimethyl prepared substantially according to the teachings of US-A-2003/004286:

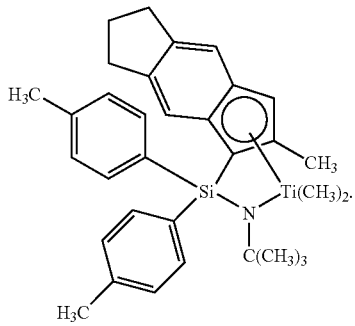

Catalyst (A10) is bis(dimethyldisiloxane)(indene-1-yl)zirconium dichloride available from Sigma-Aldrich:

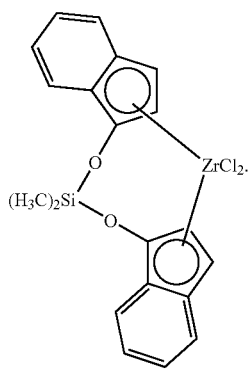

Shuttling Agents The shuttling agents employable include diethylzinc, di(i-butyl)zinc, di(n-hexyl)zinc, triethylaluminum, trioctylaluminum, triethylgallium, i-t(O)butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide, n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide, ethylzinc (2,6-diphenylphenoxide), and ethylzinc (t-butoxide).

The inventive interpolymers may comprise alternating blocks of differing comonomer content (including homopolymer blocks). The inventive interpolymers may also comprise a distribution in block size of polymer blocks of differing density or comonomer content, which is a Schultz-Flory type of distribution.

The ethylene/α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. Propylene and non-conjugated dienes are preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene and optionally one or more diene monomers. Preferred α-olefins for use in this embodiment of the present invention are designated by the formula $CH_2$=$CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The polymers desirably have an ethylene content of from 20 to 90 percent, a diene content of from 0.1 to 10 percent, and an α-olefin content of from 10 to 80 percent, based on the total weight of the polymer. Further preferably, the pseudo-block polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

The ethylene/α-olefin interpolymers of the present invention may be used in a number of applications, a non-limiting set of examples of which are given below. The interpolymers may be used an impact modifier for polypropylene; a compatibilizer for random ethylene/alpha olefin copolymers or termonomers and polypropylene; and, the interpolymers may be used as a peroxide crosslinked elastomer with either ethylene/alpha olefin copolymers or ethylene/alpha olefin/nonconjugated diene termonomers. Additionally, the lower melting point allows for manufacture in standard thermoset applications. Such applications include, but are not limited to: conveyor belting; V-belting; crosslinked foams, including, but not limited to, midsole foams in footwear, foamed mats, wet suits, extruded sponge profiles, dual hardness sponge/solid coextruded profiles, single ply roofing, and windshield wipers.

For an ethylene/alpha olefin/nonconjugated diene termonomer composition, sulfur or phenolic cured versions of elastomeric compositions may be produced. Similar applications may be used as described for peroxide crosslinked elastomers.

The compositions of the present invention may also be used in oil extended gel compounds in thermoplastic or thermoset applications.

In addition, the ethylene/α-olefin interpolymers of the present invention may be used in noise, vibration and harshness (NVH) control related applications.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

Testing Methods

In the examples that follow, the following analytical techniques are employed:
GPC-IR Method
Gel Permeation Chromatography (GPC)

The gel permeation chromatographic system is either a Polymer Laboratories Model PL-210 or a Polymer Laboratories Model PL-220 instrument. The column and carousel compartments are operated at 150° C. Four Polymer Laboratories 20-micron Mixed-A columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 200 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene} = 0.431 (M_{polystyrene})$.

Polyetheylene equivalent molecular weight calculations are performed using Viscotek TriSEC software Version 3.0.

Molecular Weight-Comonomer Composition Measurement by Infra-Red Detector

The comonomer composition throughout the GPC curve can be measured using an IR4 infra-red detector that is available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 $cm^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with a GPC instrument provides both a concentration ($CH_2$) and composition ($CH_3$) signal response of the eluted polymer during the GPC process. A polymer specific calibration can be created by measuring the area ratio of the $CH_3$ to $CH_2$ for polymers with known comonomer content (preferably measured by NMR). The comonomer distribution of a polymer can be estimated by applying a reference calibration of the ratio of the areas for the individual $CH_3$ and $CH_2$ response (i.e. area ratio $CH_3/CH_2$ versus comonomer content).

By taking the ratio of the $CH_3/CH_2$ response at each elution volume, the response to the polymer's composition is measured. After applying the appropriate reference calibration, the composition response can be used to estimate the comonomer amount at each elution volume. Integration of the entire GPC profile provides the average comonomer content of the polymer while the slope of the line from the comonomer versus molecular weight provides an indication of the uniformity of the comonomer distribution. When integrating the GPC chromatograph for composition determination, the integration region should be set to be greater than 5 weight percent of the polymer on either end of the chromatogram.

The application of infra-red spectroscopy to measure the comonomer content of polymers in this system is similar in principle to GPC/FTIR systems as described in the following references:

Markovich, Ronald P.; Hazlitt, Lonnie G.; Smith, Linley; "Development of gel-permeation chromatography-Fourier transform infrared spectroscopy for characterization of ethylene-based polyolefin copolymers", *Polymeric Materials Science and Engineering* (1991), 65, 98-100.

Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", *Polymer* (2002), 43, 59-170.

DSC Standard Method

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Density

Samples for density measurement are prepared according to ASTM D1928. Measurements are made within one hour of sample pressing using ASTM D792, Method B.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

Mooney Viscosity

Mooney viscosity is measured in accordance with ASTM D1646-06 at 125° C., ML 1+4 (MU)).

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989)), which is incorporated by reference herein in its entirety.

Additional Method for $^{13}$C NMR Analysis

The following generally describes an NMR methodology to determine the composition, sequence distribution and ratio of amorphous and semi-crystalline blocks of an ethylene-propylene olefin block copolymer with ethylene/propylene segment/block compositions that differ by less than 25-30 wt % ethylene by using the relationship between NMR integrals and comonomer concentration.

For a diblock copolymer with both blocks made by a specific catalyst, the NMR integrals fit the following equation:

$$I = P*f(E1) + (1-P)*f(E2)$$

Where
I is the integral for a selected peak of copolymer
P is the weight fraction of the first block
E1 is the concentration of ethylene in first block
E2 is the concentration of ethylene in second block
f(E1) is the integral contribution from the first block
f(E2) is the integral contribution from the second block
As there are more than 3 integrals and only three unknowns (P, E1 and E2), an optimized solution of P, E1 and E2 can be obtained from normalized NMR integrals.

In the second step, assign an initial value to E1 corresponding to the value expected from the process parameters and calculate corresponding integrals with equations.

In the third step, assign an initial value to E2 corresponding to the value expected from the process parameters and calculate corresponding integrals with equations.

In the fourth step, assign an initial value to P corresponding to the value expected from the process parameters and the equation, I=P*f(E1)+(1−P)*f(E2), is used to get simulated integrals.

Lastly, the calculated residual errors between raw normalized and simulated integrals are minimized to minimize the sum of the residual errors to get P, E1 and E2.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 µm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 µm polytetrafluoroethylene coated filter paper (available from Osmonics Inc., Cat# Z50WP04750). The filtrated fractions are dried overnight in a vacuum oven at 60° C. and weighed on an analytical balance before further testing.

Turbidity

Turbidity of the oil or solvent solutions were measured using a HACH RATIO Turbidimeter Model 18900 using the 0-20 NTU resolution scale (+/−0.1 NTU).

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments are carried out in a dry nitrogen atmosphere using dry box techniques. All solvents used are HPLC grade and are dried before their use.

MMAO refers to modified methylalumoxane, a triisobutylaluminum modified methylalumoxane available commercially from Akzo-Nobel Corporation.

Cocatalyst 1 A mixture of methyldi($C_{14-18}$alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883 Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Examples 1-4

Comparative Example A

Ethylene/propylene copolymers are prepared using two continuous stirred tank reactors (CSTR) connected in series. Each reactor is hydraulically full and set to operate at to steady state conditions. The shuttling agent (SA1) is added to the first reactor along with catalyst A-1, Cocatalyst 1, a scavenger (triisobutylaluminum modified methylalumoxane MMAO, available from Akzo-Nobel, Inc.), and solvent (mixed alkanes (Isopar™ E, available from ExxonMobil Chemicals, Inc.). Operating conditions for the two reactors are provided in Tables 1 and 2. Polymer properties are provided in Table 3.

Examples 5-12

Examples 5-12 are manufactured using a non-adiabatic polymerization system consisting of two recirculating loop reactors configured in series. The shuttling agent (SA1) is added to the first reactor along with catalyst A-1, Cocatalyst 1, a scavenger (triisobutylaluminum modified methylalumoxane MMAO, available from Akzo-Nobel, Inc.), and solvent (mixed alkanes (Isopar™ E, available from ExxonMobil Chemicals, Inc.). Operating conditions for the two reactors are provided in Tables 1 and 2. Polymer properties are provided in Table 3.

Comparative Example B is Paratone 8941 (ExxonMobil Chemical Co.) and Comparative Example C is Nordel 225 (The Dow Chemical Company).

TABLE 1

Process Conditions First CSTR or Loop Reactor

| Run | Solv. kg/hr | $C_2H_4$[1] kg/hr | $C_3H_6$[1] kg/hr | $H_2$ sccm[2] | T °C. | Cat. A-1 Conc mmol/kg | Cat. A-1 Flow kg/hr | Cocat. Conc. mmol/kg | Cocat flow kg/hr | MMAO Conc mmol/kg | MMAO Flow kg/hr | SA1 Conc mmol/kg | SA1 Flow kg/hr | Conv.[4] | R-1 Split[5] |
|---|---|---|---|---|---|---|---|---|---|---|---|---|---|---|---|
| A* | 22 | 1.84 | 0.75 | 160 | 107 | 0.5 | 0.21 | 0.252 | 0.5 | 2 | 0.1 | — | — | | 61 |
| 1 | 22 | 1.84 | 0.75 | 0 | 105 | 0.5 | 0.21 | 0.25 | 0.5 | — | — | 153[3] | 0.142 | | 61 |
| 2 | 25.5 | 2 | 1.1 | 0 | 105 | 0.5 | 0.245 | 0.286 | 0.5 | — | — | 153[3] | 0.12 | | 80 |
| 3 | 25.5 | 1.92 | 1.4 | 0 | 107 | 1 | 0.125 | 1 | 0.132 | — | — | 153[3] | 0.125 | 88.6 | 79 |
| 4 | 25.5 | 2.1 | 1.4 | 0 | 111 | 1 | 0.13 | 1 | 0.156 | — | — | 153[3] | 0.146 | 69.7 | 68 |
| 5 | 173.6 | 21.7 | 28.6 | 0 | 95 | 1.68 | 0.63 | 5.81 | 0.27 | 40.5 | 0.38 | 458 | 0.42 | 84.2 | 64 |
| 6 | 188.6 | 18.8 | 18.3 | 0 | 104 | 1.68 | 0.55 | 5.81 | 0.31 | 40.5 | 0.42 | 458 | 0.31 | 91.1 | 64 |
| 7 | 180.4 | 17.7 | 13.4 | 0 | 105 | 1.68 | 0.55 | 5.81 | 0.32 | 40.5 | 0.44 | 458 | 0.33 | 89.9 | 52 |
| 8 | 180.5 | 17.6 | 18.8 | 0 | 104 | 1.68 | 0.54 | 5.81 | 0.31 | 40.5 | 0.42 | 458 | 0.31 | 89.7 | 55 |
| 9 | 168.4 | 15.2 | 19.4 | 0 | 103 | 1.68 | 0.54 | 5.81 | 0.30 | 40.5 | 0.42 | 458 | 0.30 | 89.5 | 53 |
| 10 | 115.4 | 8.7 | 23.7 | 0 | 105 | 1.68 | 0.47 | 5.81 | 0.27 | 40.5 | 0.44 | 458 | 0.32 | 87.6 | 39 |
| 11 | 180.4 | 17.5 | 20.5 | 0 | 105 | 1.68 | 0.56 | 5.81 | 0.24 | 40.5 | 0.45 | 458 | 0.33 | 89.9 | 55 |
| 12 | 180.5 | 17.5 | 20.5 | 25.6 | 105 | 1.68 | 0.55 | 5.81 | 0.24 | 40.5 | 0.43 | 458 | 0.31 | 91.3 | 56 |

*Comparative, not an example of the invention.
[1]Total flow (recycle + fresh, Ex. 5-12)
[2]Standard cm$^3$/min
[3]The DEZ solution also contains 1-5 mol percent of MMAO.
[4]Percent ethylene conversion in reactor.
[5]Percent of polymer produced in reactor 1.

TABLE 2

Process Conditions Second CSTR or Loop Reactor.

| Ex. | Solv. kg/hr | $C_2H_4$ kg/hr | $C_3H_6$ kg/hr | $H_2$ sccm[1] | T °C. | Cat. A-1 Conc. mmol/kg | Cat. A-1 Flow kg/hr | Cocat. Conc. mmol/kg | Cocat. Flow kg/hr | MMAO Conc mmol/Kg | MMAO Flow kg/hr | Conv.[2] | R-2 Split[3] | Rate kg/hr |
|---|---|---|---|---|---|---|---|---|---|---|---|---|---|---|
| A* | 13 | 0.95 | 2.7 | 0 | | 0.5 | 0.08 | 0.5 | 0.096 | 2 | 0.1 | | 39 | |
| 1 | 14 | 0.88 | 2.7 | 0 | | 0.5 | 0.08 | 0.5 | 0.096 | 2 | 0.1 | | 39 | |
| 2 | 5 | 0 | 1 | 0 | | 0.5 | 0.08 | 0.5 | 0.06 | 2 | 0.08 | | 20 | |
| 3 | 5.5 | 0.2 | 1 | 0 | 109 | 1 | 0.056 | 1 | 0.064 | 3.06 | 0.08 | | 21 | 3 |
| 4 | 10.5 | 0.4 | 1.75 | 0 | 106 | 1 | 0.065 | 1 | 0.078 | 2 | 0.05 | | 32 | 3 |
| 5 | 44.7 | 6.1 | 17.1 | 0 | 105 | 1.68 | 0.146 | 5.81 | 0.063 | 40.55 | 0 | 76.3 | 36 | 38 |
| 6 | 50.6 | 9.5 | 27.6 | 0 | 105 | 1.68 | 0.163 | 5.81 | 0.138 | 40.55 | 0 | 73.9 | 36 | 39 |
| 7 | 56.9 | 10.0 | 29.7 | 0 | 106 | 1.68 | 0.189 | 5.81 | 0.163 | 40.55 | 0 | 82.5 | 48 | 39 |
| 8 | 56.6 | 10.0 | 30.8 | 0 | 110 | 1.68 | 0.215 | 5.81 | 0.185 | 40.55 | 0 | 81.7 | 45 | 41 |
| 9 | 57.2 | 10.0 | 30.8 | 0 | 109 | 1.68 | 0.224 | 5.81 | 0.193 | 40.55 | 0 | 83.0 | 47 | 41 |
| 10 | 131.0 | 19.5 | 7.5 | 0 | 115 | 1.68 | 0.421 | 5.81 | 0.362 | 40.55 | 0 | 88.1 | 61 | 40 |
| 11 | 54.4 | 10.3 | 31.5 | 0 | 105 | 1.68 | 0.182 | 5.81 | 0.156 | 40.55 | 0 | 78.2 | 45 | 42 |
| 12 | 52.6 | 10.3 | 31.4 | 47.2 | 105 | 1.68 | 0.166 | 5.81 | 0.142 | 40.55 | 0 | 81.0 | 44 | 42 |

*Comparative, not an example of the invention.
[1]Total feed (carryover + fresh, ex. 5-12).
[2]Percent ethylene conversion in reactor 2.
[3]Percent of polymer produced in reactor 2.

TABLE 3

Polymer Characterization Data

Dual reactor products

| Run | Wt % Ethylene (FTIR) | Wt % Ethylene (NMR) | Mooney 125° C., ML 1 + 4 | $I_2$ (dg/min) | $I_{10}/I_2$ | Mw (g/mol) | Mn (g/mol) | Mw/Mn | Tm (° C.) | $\Delta H_{fusion}$ (J/g) | Tc (° C.) |
|---|---|---|---|---|---|---|---|---|---|---|---|
| A* | 65.6 | — | 13 | 1.8 | 6.1 | 112900 | 58820 | 1.9 | 40 | 43.1 | 24.5 |
| 1 | 66.3 | 63.5 | 18.7 | 1.2 | 6.0 | 91580 | 38070 | 2.4 | 35.6 | 43.3 | 35.6 |
| 2 | 64.6 | 64.6 | 16.5 | 1.4 | 6.3 | 116900 | 51150 | 2.3 | 23.0 | 42.5 | 12.5 |
| 3 | 67 | 66 | 24.4 | 0.8 | 5.9 | 116500 | 48900 | 2.4 | 39.7 | 42.2 | 24.6 |
| 4 | 65.1 | 63.5 | 24.5 | 0.8 | 5.9 | 111800 | 43720 | 2.6 | 38.5 | 37.1 | 24 |
| 5 | 66.9 | — | 25 | — | — | 120200 | 64740 | 1.9 | 39 | 34 | |
| 6 | 69.2 | — | 43.5 | — | — | 150600 | 68480 | 2.2 | 41 | 33 | |
| 7 | 68.6 | — | 43 | — | — | 147000 | 73890 | 2.0 | 57 | 34.5 | |
| 8 | 65.7 | — | 43.8 | — | — | 145400 | 67080 | 2.2 | | | |
| 9 | 58.2 | — | 39.5 | — | — | 143500 | 59180 | 2.4 | 41 | 28 | |
| 10 | 64.7 | — | 43.7 | — | — | 138900 | 61060 | 2.3 | 13 | 17 | |
| 11 | 64.2 | — | 40.4 | — | — | 145600 | 67540 | 2.2 | 35 | 22 | |
| 12 | 64.3 | — | 41.3 | — | — | 149100 | 70890 | 2.1 | 32 | 23 | |

| Run | Wt % Ethylene (FTIR) | Wt % Ethylene (NMR) | Wt % $C_2$ Incorporation in Polymer from Reactor 1 | Wt % $C_2$ Incorporated in Polymer from Reactor 2 | Wt % Reactor 1 polymer made | Wt % Reactor 2 polymer made |
|---|---|---|---|---|---|---|
| A* | 65.6 | — | 72.2 | 50.0 | 61 | 39 |
| 1 | 66.3 | 63.5 | 72.2 | 50.0 | 61 | 39 |
| 2 | 64.6 | 64.6 | 72.2 | | 80 | 20 |
| 3 | 67 | 66 | 71.4 | 50.0 | 79 | 21 |
| 4 | 65.1 | 63.5 | 71.4 | 50.0 | 68 | 32 |
| 5 | 66.9 | — | 69.6 | 50.3 | 64 | 36 |
| 6 | 69.2 | — | 72.5 | 45.2 | 64 | 36 |
| 7 | 68.6 | — | 80.4 | 50.0 | 52 | 48 |
| 8 | 65.7 | — | 70.1 | 47.6 | 55 | 45 |
| 9 | 58.2 | — | 69.4 | 48.0 | 53 | 47 |
| 10 | 64.7 | — | 48.4 | 70.1 | 39 | 61 |
| 11 | 64.2 | — | 68.2 | 46.9 | 55 | 45 |
| 12 | 64.3 | — | 67.2 | 46.8 | 56 | 44 |

Reactor 1 products

| Run | Wt % Ethylene (FTIR) | Wt % Ethylene (NMR) | Mw (g/mol) | Mn (g/mol) | Mw/Mn | Tm (° C.) | $\Delta H_{fusion}$ (J/g) | Tc (° C.) |
|---|---|---|---|---|---|---|---|---|
| A* | 72.2 | 75.9 | 86440 | 31770 | 2.7 | 43.6 | 65.2 | 29.6 |
| 1 | 72.2 | 75.9 | 86440 | 31770 | 2.7 | 43.6 | 65.2 | 29.6 |
| 2 | 71.0 | 72.0 | 119900 | 58840 | 2.0 | 28.8 | 46.3 | 17 |

TABLE 3-continued

Polymer Characterization Data

| | | | | | | | | |
|---|---|---|---|---|---|---|---|---|
| 3 | 71.4 | 75.2 | 125000 | 59330 | 2.1 | 40.2 | 59.4 | 25.9 |
| 4 | 71.4 | 75.2 | 125000 | 59330 | 2.1 | 40.2 | 59.4 | 25.9 |

*comparative, not an example of the invention
[2]dg/min

GPC-IR and Turbidity Measurements

Comonomer composition throughout the GPC curve was monitored via GPC-IR. The numerical values of the comonomer content vs molecular weight fractions were plotted and fitted to a line, mx+b. The absolute slope, |m|, and turbidities in oil and dodecane are given in Table 4 below. As may be seen, for the inventive polymers, |m| is less than 4 and the turbidity is equal to or less than that of a comparable copolymer with a comparable DSC enthalpy, J/g, at greater than 55° C., $\Delta H_{>55}°$ C.

TABLE 4

| Ex. | $\Delta H_{>55° C.}$ | |m| | Turbidity (oil) | Turbidity (dodecane) |
|---|---|---|---|---|
| A* | 4.3 | 7.5 | 2.8 | 2.9 |
| 1 | 3.6 | 2.2 | 1.2 | 2 |

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds and steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. An ethylene/α-olefin interpolymer comprising two or more intramolecular segments or blocks comprising differing chemical or physical properties, said intramolecular segments characterized by possessing a most probable molecular weight distribution, wherein the ethylene/α-olefin interpolymer comprises a hard segment and a soft segment, and:
   (a) has a Mw/Mn from about 1.7 to about 3.5;
   (b) has an ethylene content in the hard segment in the range of from 70 wt % to 85 wt % based on based on total monomer content in hard segment;
   (c) (i) has a hard segment in an amount of at least 40%, at least one melting point, Tm, in degrees Celsius and an amount of ethylene in weight percent, wt % $C_2$, wherein the numerical values of Tm and wt % $C_2$ correspond to the relationship:

90° C.≥Tm≥4.1276(wt % $C_2$)−244.76; or (ii) has a hard segment composition of less than 40%, at least one melting point, Tm, in degrees Celsius and an amount of ethylene in weight percent, wt % $C_2$, wherein the numerical values of Tm and wt % $C_2$ correspond to the relationship:

80° C.≥Tm≤4.1276(wt % $C_2$)−264.95; or (iii) is characterized by an average block index greater than zero and up to about 1.0; or
   (iv) has a molecular fraction which elutes between 0° C. and 130° C. when fractionated using low temperature TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or
   (v) has a relationship between ethylene content in wt % and log molecular weight such that a line plotted of ethylene content vs log molecular weight as measured by GPC-IR has an absolute slope, m, of equal to or less than 4; and,
   (d) has a turbidity measurement of a 1.0 wt % solution of the ethylene/α-olefin interpolymer in oil or a 1.5 wt % solution in dodecane of less than or equal to that of a comparable copolymer wherein the comparable copolymer has the same DSC enthalpy (J/g) at greater than 55° C. within ±5 J/g and the same overall ethylene content within 10%; and,
   wherein the soft segment comprises 35 wt % to 80 wt % comonomer based on total monomer content in the soft segment.

2. An ethylene/α-olefin interpolymer comprising two or more intramolecular segments or blocks comprising differing chemical or physical properties, said intramolecular segments characterized by possessing a most probable molecular weight distribution, wherein the ethylene/α-olefin interpolymer comprises a hard segment and a soft segment, and:
   (a) has a Mw/Mn from about 1.7 to about 3.5;
   (b) has an ethylene content in the hard segment in the range of from 70 wt % to 85 wt % based on based on total monomer content in hard segment;
   (c) (i) has a hard segment in an amount of at least 40%, at least one melting point, Tm, in degrees Celsius and an amount of ethylene in weight percent, wt % $C_2$, wherein the numerical values of Tm and wt % $C_2$ correspond to the relationship:

0° C.≥Tm≥3.4405(wt % $C_2$)−218.99; or (ii) has a hard segment composition of less than 40%, at least one melting point, Tm, in degrees Celsius and an amount of ethylene in weight percent, wt % $C_2$, wherein the numerical values of Tm and wt % $C_2$ correspond to the relationship:

80° C.≥Tm≤4.1276(wt % $C_2$)−264.95; or (iii) is characterized by an average block index greater than zero and up to about 1.0; or
   (iv) has a molecular fraction which elutes between 0° C. and 130° C. when fractionated using low temperature TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (v) has a relationship between ethylene content in wt % and log molecular weight such that a line plotted of ethylene content vs log molecular weight as measured by GPC-IR has an absolute slope, m, of equal to or less than 4; and, (d) has a turbidity measurement of a 1.0 wt % solution of the ethylene/α-olefin interpolymer in oil or a 1.5 wt % solution in dodecane of less than or equal to that of a comparable copolymer wherein the comparable copolymer has the same DSC enthalpy (J/g) at greater than 55° C. within ±5 J/g and the same overall ethylene content within 10%; and, wherein the soft segment comprises 35 wt % to 80 wt % comonomer based on total monomer content in the soft segment.

3. The ethylene/α-olefin interpolymer of claim 1 or 2 comprising ethylene in an amount in the range of from about 55 wt % to about 75 wt %.

4. The ethylene/α-olefin interpolymer of claim 1 or 2 comprising ethylene in an amount in the range of from about 60 wt % to about 73 wt %.

5. The ethylene/α-olefin interpolymer of claim 1 or 2 having a $T_m$ in the range of from about −25° C. to about 100° C.

6. The ethylene/α-olefin interpolymer of claim 1 or 2 having a $T_m$ in the range of from about 30° C. to about 80° C.

7. The ethylene/α-olefin interpolymer of claim 1 or 2 having a $T_m$ in the range of from about 35° C. to about 75° C.

8. The ethylene/α-olefin interpolymer of claim 1 or 2 having a turbidity in a 1.0 wt % solution of the ethylene/α-olefin interpolymer in oil or a 1.5 wt % solution in dodecane that is less than 1.5 NTU and a DSC enthalpy at greater than 55° C. of less than 2 J/g.

* * * * *